US011941932B2

(12) United States Patent
Radicella et al.

(10) Patent No.: US 11,941,932 B2
(45) Date of Patent: *Mar. 26, 2024

(54) SECURITY CONTROL AND ACCESS SYSTEM

(71) Applicant: Isonas, Inc., Boulder, CO (US)

(72) Inventors: Michael Radicella, Erie, CO (US); Roger Matsumoto, Superior, CO (US); Matthew J. Morrison, Johnstown, CO (US); Richard Burkley, Boulder, CO (US); Kriston Chapman, Lyons, CO (US); Shirl Jones, Lyons, CO (US)

(73) Assignee: Isonas, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,882

(22) Filed: May 9, 2022

(65) Prior Publication Data

US 2023/0092910 A1 Mar. 23, 2023

Related U.S. Application Data

(63) Continuation of application No. 16/541,700, filed on Aug. 15, 2019, now Pat. No. 11,341,797, which is a continuation of application No. 15/416,760, filed on Jan. 26, 2017, now Pat. No. 10,388,090, which is a continuation of application No. 14/858,702, filed on Sep. 18, 2015, now Pat. No. 9,589,400, which is a (Continued)

(51) Int. Cl.

| | |
|---|---|
| ***G07C 9/27*** | (2020.01) |
| ***G07C 9/00*** | (2020.01) |
| ***G07C 9/25*** | (2020.01) |

(52) U.S. Cl.

CPC .......... *G07C 9/27* (2020.01); *G07C 9/00182* (2013.01); *G07C 9/00571* (2013.01); *G07C 9/257* (2020.01); *G07C 2209/08* (2013.01)

(58) Field of Classification Search

CPC ................ E05B 47/00; E05B 47/0012; E05B 2047/0086; E05B 2047/0091; E05B 63/0052; E05B 63/20; E05B 65/0003; G07C 9/00309; G07C 9/0069; G07C 9/00896; G07C 9/00904; G07C 9/00912; G07C 2009/00603; G07C 2009/00777

See application file for complete search history.

(56) References Cited

U.S. PATENT DOCUMENTS 5,713,270 A * 2/1998 Fitzgerald ............ B30B 9/3007 100/229 A
6,359,547 B1 * 3/2002 Denison ............... B60R 25/102 340/663

(Continued)

*Primary Examiner* — Thien M Le

(74) *Attorney, Agent, or Firm* — Taft Stettinius & Hollister LLP

(57) ABSTRACT

The present disclosure provides methods, devices, and systems for controlling access to a controlled area. The method may comprise receiving a credential identifier in an access controller associated with an entrance to the enclosed area, and then authenticating the credential identifier. The method may then comprise sending an unlock signal through a solid state relay within the access controller to power a lock associated with but external to the access controller to unlock a door at the entrance to the enclosed area when the credential identifier has been successfully authenticated.

18 Claims, 13 Drawing Sheets

Related U.S. Application Data continuation-in-part of application No. 14/164,884, filed on Jan. 27, 2014, now Pat. No. 9,336,633, which is a continuation of application No. 12/833,890, filed on Jul. 9, 2010, now Pat. No. 8,662,386, which is a continuation of application No. 11/838,022, filed on Aug. 13, 2007, now Pat. No. 7,775,429.

(60) Provisional application No. 60/822,595, filed on Aug. 16, 2006.

(56) References Cited

U.S. PATENT DOCUMENTS

| | | | | |
|---|---|---|---|---|
| 6,384,380 | B1 * | 5/2002 | Faries, Jr. | A61G 12/001<br>219/385 |
| 2008/0236213 | A1 * | 10/2008 | Blanch | E05B 47/0673<br>70/107 |
| 2010/0300130 | A1 * | 12/2010 | Shoenfeld | F25D 29/00<br>62/236 |
| 2011/0087370 | A1 * | 4/2011 | Denison | G07C 9/27<br>221/9 |
| 2011/0224509 | A1 * | 9/2011 | Fish | H04L 9/0894<br>600/301 |
| 2012/0011366 | A1 * | 1/2012 | Denison | G07C 9/00571<br>707/812 |
| 2012/0011367 | A1 * | 1/2012 | Denison | G07F 9/026<br>707/812 |
| 2013/0241954 | A1 * | 9/2013 | Yu | G06F 3/1446<br>345/1.3 |
| 2016/0019736 | A1 * | 1/2016 | Radicella | G07C 9/27<br>235/382 |

* cited by examiner

SECURITY CONTROL AND ACCESS SYSTEM

PRIORITY AND RELATED APPLICATIONS

This application is a continuation of U.S. patent application Ser. No. 16/541,700 filed on Aug. 15, 2019, pending, which is a continuation of U.S. patent application Ser. No. 15/416,760 filed on Jan. 26, 2017 and issued as U.S. Pat. No. 10,388,090 on Aug. 20, 2019, which in turn is a continuation U.S. patent application Ser. No. 14/858,702 filed on Sep. 18, 2015 and issued as U.S. Pat. No. 9,589,400 on Mar. 7, 2017, which in turn is a continuation-in-part of U.S. patent application Ser. No. 14/164,884 filed on Jan. 27, 2014, now U.S. Pat. No. 9,336,633, which in turn is a continuation of U.S. patent application Ser. No. 12/833,890, filed Jul. 9, 2010, now U.S. Pat. No. 8,662,386, which in turn is a continuation of U.S. patent application Ser. No. 11/838,022, filed Aug. 13, 2007, now U.S. Pat. No. 7,775,429, which claimed priority to U.S. Provisional Application No. 60/822,595, filed Aug. 16, 2006. The details of each of the above applications are incorporated herein by reference in their entirety and for all proper purposes.

FIELD OF THE INVENTION

The present invention relates generally to electronic security systems. In particular, but not by way of limitation, the present invention relates to methods and systems for controlling access to an enclosed area such as, without limitation, a building or a room within a building, a cabinet, a parking lot, a fenced-in region, or an elevator.

BACKGROUND OF THE INVENTION

Access control systems are commonly used to limit access to enclosed areas such as buildings, rooms within buildings, or fenced-in regions to only those people who have permission to enter. Conventional access control systems include access card readers at doors of the secured building. People who have permission to enter the building are provided an access control card that can be read by the access card readers. The card reader reads information from the card, and communicates the information to a control panel, which determines whether the door should be unlocked. If the door should be unlocked (i.e., the card is associated with a person who has permission to enter), the control panel then sends a signal to the locking mechanism of the door causing it to unlock. Conventional access control systems have several drawbacks and fail to take advantage of available modern technologies.

For example, in most conventional systems, radio frequency identification (RFID) is used for identification of the card to the access control system. The access card reader includes an RFID transceiver, and the access card includes an RFID tag or transponder. The RFID transceiver transmits a radio frequency query to the card as the card passes over it. The transponder includes a silicon chip and an antenna that enables the card to receive and respond to the RF query. The response is typically an RF signal that includes a pre-programmed identification (ID) number. The card reader receives the signal and transmits the ID number to the control panel via a wire connection. Conventional card readers are not very sophisticated. These card readers may perform some basic formatting of the identification data prior to sending it to the control panel, but are generally unable to perform higher level functions.

The control panel is typically mounted on a wall somewhere in the building. The control panel conventionally includes a bank of relays that are each controlled by a controller device. The controller device accesses memory to determine whether the identification number received from the card reader is recognized and valid. If so, the controller causes the associated relay to open (or close) to thereby send a signal to the door lock, which causes the lock to enter the unlocked state. The lock typically remains unlocked for a specified amount of time.

Conventional control panels have several drawbacks. For one, control panels consume a relatively large amount of space in relation to the number of doors they control. A control panel typically includes a specified number of relay banks, with each bank uniquely associated with the door it controls. For example, a control panel may have eight relay banks to control eight doors. Such a control panel could easily take up a 2 square foot area when mounted on a wall. If more than eight doors need to be controlled, then an additional control panel must be installed.

In addition, the "closed" architecture of conventional control panels make them inflexible, costly to maintain, and not user friendly. The closed architecture of the conventional control panels means that their design, functionality, specifications are not disclosed by the manufacturers or owners. In addition, control panel design is typically very complex, and specialized to a particular purpose, which renders them inaccessible by a typical building owner who has no specialized knowledge. As a result, when a control panel fails or needs to be upgraded, the building owner has no choice but to call a specialized technician to come onsite to perform maintenance or upgrading. The monetary cost of such a technician's services can be very high. In addition, a great deal of time could be wasted waiting for the technician to travel to the site. To solve the above mentioned problems and drawbacks, the inventions disclosed in U.S. Pat. No. 7,775,429 were developed. The details of U.S. Pat. No. 7,775,429 are incorporated into the present disclosure by reference in their entirety and for all proper purposes. It is upon these inventions that the present disclosure capitalizes and provides further improvement to existing systems.

SUMMARY OF THE INVENTION

One aspect of the present disclosure provides a method for controlling access to a controlled area. The method may comprise receiving a credential identifier in an access controller associated with an entrance to the enclosed area, and then authenticating the card identification signal. The method may then comprise sending an unlock signal through a solid state relay within the access controller to power a lock associated with but external to the access controller to unlock a door at the entrance to the enclosed area when the credential identifier has been successfully authenticated.

Another aspect of the disclosure provides an access control device for controlling access to an enclosed area. The access control device may comprise a communication module configured to receive a credential identifier, a local input/output module configured to send an unlock signal to power a lock external to the access control device to unlock a door at an entrance to the enclosed area when the credential identifier has been successfully authenticated, and a solid state relay within the access control device through which the unlock signal is sent.

Yet another aspect of the disclosure provides a system for controlling access to one or more enclosed areas. The system may comprise at least one access controller comprising a solid state relay. Each access controller may be capable of controlling access through an entrance to an enclosed area. The system may also comprise an access control server in communication with the at least one access controller, the access control server being capable of controlling the operation of the solid state relay within the at least one access controller. In a network mode of operation, the access control server may be configured to perform authentication of a credential identifier received from the at least one access controller and to send an unlock signal through the solid state relay at the at least one access controller to power a lock external to the at least one access controller to unlock a door at the entrance to the enclosed area when the access control server has successfully authenticated the received card identification signal. In a standalone mode of operation, the at least one access card controller may be configured to perform local authentication of a received credential identifier independently of the access control server and to send an unlock signal through a local solid state relay of the at least one access controller to power a lock external to the at least one access controller to unlock a door at the entrance to the enclosed area when the at least one access controller has successfully authenticated the received credential identifier. Each access controller may be configured to serve, from the access controller, configuration data that can be displayed by a device external to the access controller.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

Prior to describing one or more preferred embodiments of the present invention, definitions of some terms used throughout the description are presented.

Definitions

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may," "can," "could," or "might" be included or have a characteristic, that particular component or feature is not required to be included or have the characteristic.

The terms "responsive" and "in response to" includes completely or partially responsive.

The term "computer-readable medium" is a medium that is accessible by a computer and can include, without limitation, a computer storage medium and a communications medium. "Computer storage medium" generally refers to any type of computer-readable memory, such as, but not limited to, volatile, non-volatile, removable, or non-removable memory. "Communication medium" refers to a modulated signal carrying computer-readable data, such as, without limitation, program modules, instructions, or data structures.

Figure 1:
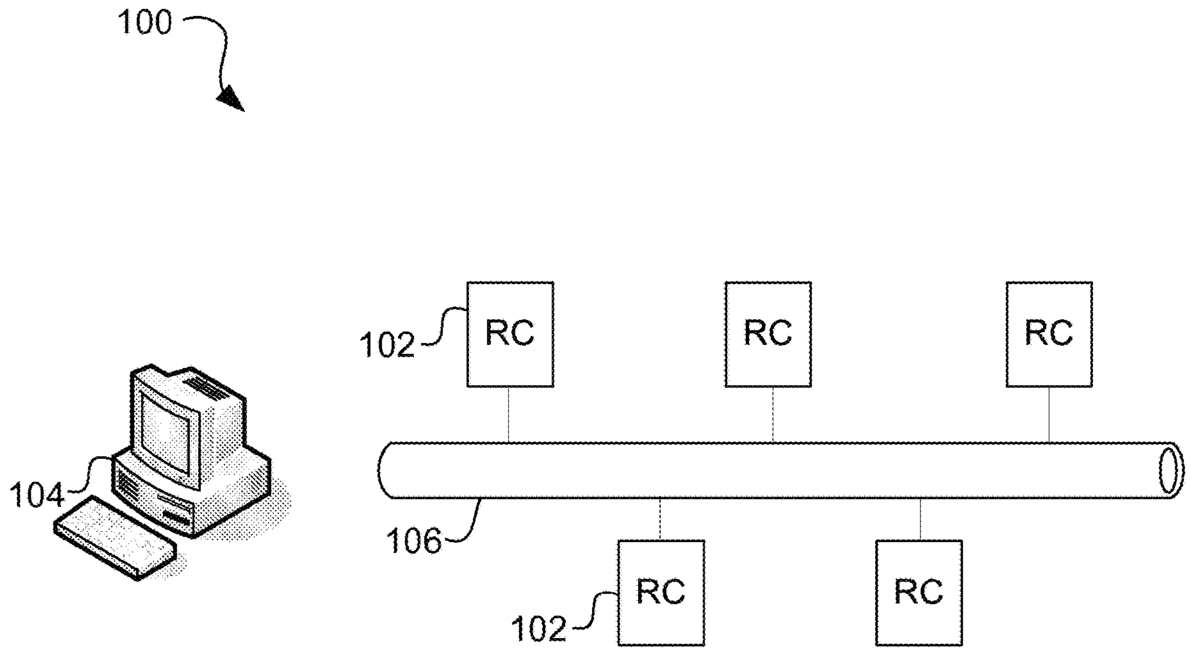
FIG. 1 schematic diagram illustrating primary components in an access control system in accordance with one embodiment with the present invention.

FIG. 1 schematic diagram illustrating primary components in an access control system 100 in accordance with one embodiment with the present invention. One or more access card reader/controllers 102 are in operable communication with a backend control system, such as an access control server 104, via a communication channel 106. Each of the access card reader/controllers 102 is associated with, and controls access through, a door (not shown). Herein, "door" is used in its broad sense to include, without limitation, an exterior door to a building, a door to a room within a building, a cabinet door, an elevator door, and a gate of a fence. Unlike conventional access card readers, the access card reader/controllers 102 each are operable to determine whether to unlock or lock the access card reader/controller's associated door. The access control server 104 is operable to perform management and configuration functions with respect to the access card reader/controllers 102.

The communication channel 106 may be either wired or wireless. In a wireless implementation, there is no need for a dedicated wire connection between each of the access card reader/controllers 102 and the access control server 104. As such, a wireless implementation can reduce implementation complexity and the number of points of potential failure that can exist in conventional systems. The wireless channel 106 can operate with a number of communication protocols, including, without limitation, transmission control protocol/Internet protocol (TCP/IP).

In some embodiments, access card readers operate in a synchronous mode, in which they are periodically polled by the primary access control device 104, and respond with their ID. Such polling can be an inefficient use of network bandwidth. Therefore, in accordance with various embodiments, the access control system 100 can operate in an asynchronous mode, as well as a synchronous mode. In the asynchronous mode, there is no need for the access control server 104 to periodically poll the access card reader/controllers 102. As such, network traffic is beneficially reduced in comparison to network traffic in a synchronous mode, in which polling is required. The asynchronous embodiment can also improve performance since events at the reader/controllers are reported immediately without waiting for the computer to poll for information.

In accordance with at least one embodiment, the system 100 implements programmable failure modes. As discussed further below, one of these modes is a network mode, in which the access control server 104 makes all decisions regarding locking and unlocking the doors; another mode is a standalone mode, in which each access card reader/controller 102 determines whether to unlock or lock a door, based on information in a memory local to the access card reader/controller 102.

In various embodiments, multiple access card reader/controllers 102 employ ZigBee functionality. In these embodiments, the access card reader/controllers 102 and the access control server 104 form a ZigBee mesh network. ZigBee functionality is discussed in more detail further below with reference to FIGS. 2-3.

Figure 2:
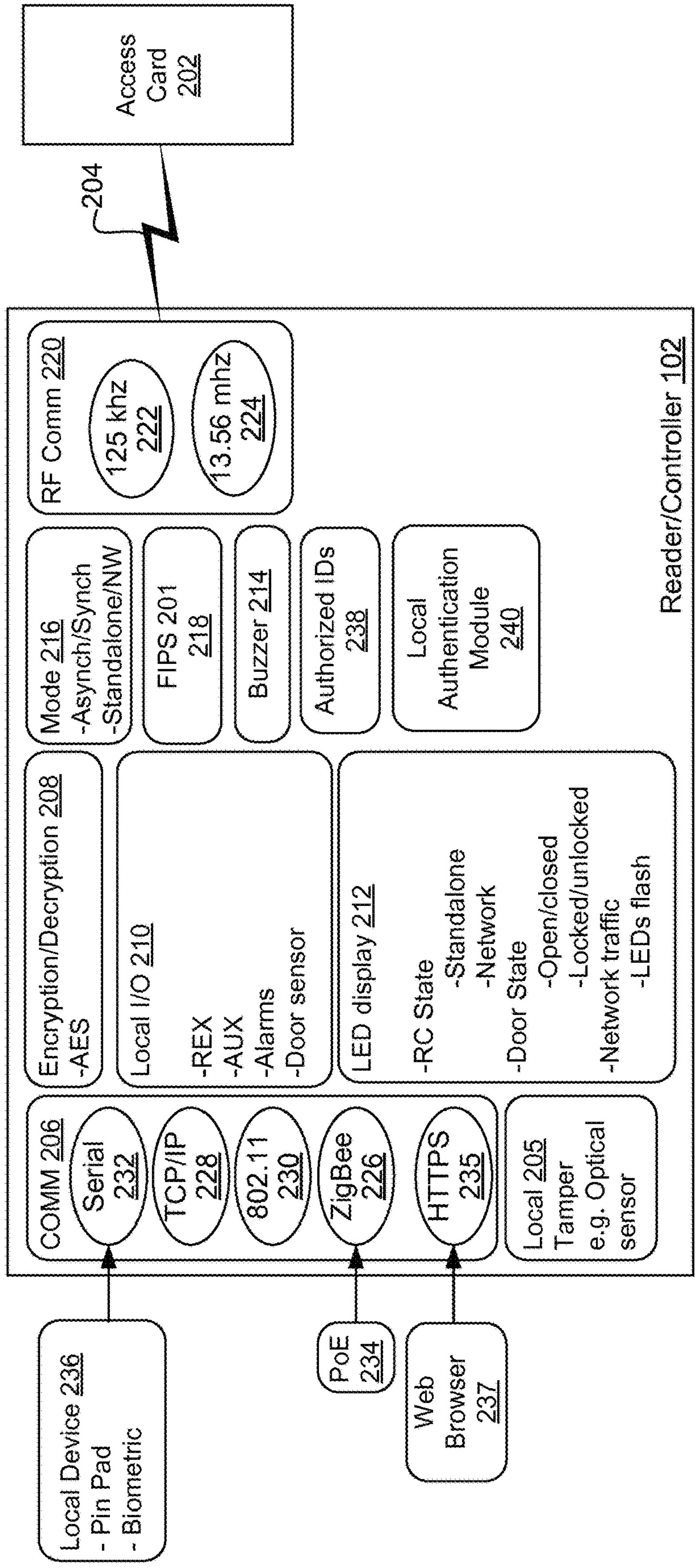
FIG. 2 is a functional block diagram illustrating functional modules that are included in a reader/controller in accordance with one embodiment.

FIG. 2 is a functional block diagram illustrating functional modules that are included in a reader/controller 102 in accordance with one embodiment. An access card 202 is shown emitting an RF signal 204 to the reader/controller 102. The RF signal 204 includes information including, but not limited to, identification (ID) information. Among other functions, the access card reader/controller 102 uses the RFID signal 204 to determine whether to unlock the door. The access card reader/controller 102 also performs other functions related to configuration, network communications, and others.

In this regard, the access card reader/controller 102 includes a number of modules including a local tamper detector 205, a device communication module 206, an encryption module 208, local input/output (I/O) 210, an LED display module 212, a buzzer module 214, a mode module 216, a federal information processing standard (FIPS) module 218, and an RF communication module 220.

In some embodiments, the access card reader/controller 102 reads RFID signal 204 at a single frequency—for example, a frequency of either 13.56 MHz or 125 kHz. In other embodiments, the reader/controller may include a dual reader configuration wherein the reader/controller can read at two frequencies, such as 125 kHz and 13.56 MHz. As such, in these embodiments, the RF communication module 220 includes a 125 kHz RF communication interface and a 13.56 MHz communication interface 224.

The local tamper detector 205 can detect when someone is attempting to tamper with the access card reader/controller 102 or with wires leading to or from the reader/controller 102, in order to try to override the control system and break in. In various embodiments, the local tamper detector 205 comprises an optical sensor. If such tampering is detected, the access card reader/controller sends a signal to the door locking mechanism that causes it to remain locked, despite the attempts to override the controller. For example, the optical tamper sensor 205 could send a signal to the local I/O module 210 to disable power to the door lock.

The device communication module 206 includes a number of modules such as a ZigBee module 226, a TCP/IP module 228, an IEEE 802.11 module 230, serial module 232, and HTTPS (secure Hypertext Transfer Protocol—HTTP) module 235. In some embodiments, communication module 206 supports both HTTP and HTTPS protocols. Each of the foregoing communication modules provides a different communication interface for communicating with devices in accordance with its corresponding protocol or format.

With regard to the ZigBee communication interface 226, a ZigBee protocol is provided. ZigBee is the name of a specification for a suite of high level communication protocols using small, low-power digital radios based on the IEEE 802.15.4 standard for wireless personal area networks (WPANs). ZigBee protocols generally require low data rates and low power consumption. ZigBee is particularly beneficial in an access control environment because ZigBee can be used to define a self-organizing mesh network.

In a ZigBee implementation, the access control server 104 acts as the ZigBee coordinator (ZC). One of the access card reader/controllers is the ZigBee end device (ZED). The other ZigBee access card reader/controllers are ZigBee routers (ZRs). The ZC, ZED, and ZRs form a mesh network of access card reader/controllers that are self-configuring. A ZigBee network is also scalable, such that the access card reader/controller network can be extended. In one embodiment, ZigBee is implemented in the access card reader/controller with a ZigBee chip.

The ZigBee interface 226 interfaces with Power-over-Ethernet (PoE) 234. PoE or "Active Ethernet" eliminates the need to run separate power cables to the access card reader/controller 102. Using PoE, system installers run a single CATS Ethernet cable that carries both power and data to each access card reader/controller 102. This allows greater flexibility in the locating of access points and reader/controllers 102, and significantly decreases installation costs in many cases. PoE 234 provides a power interface to the associated door locking mechanism, and also provides power to the components of the access card reader/controller 102. In other embodiments, a communication interface other than PoE that provides power without the need for separate power cables may be used to power the access card reader/controllers 102.

The IEEE 802.11 interface 230 provides communication over a network using the 802.11 wireless local area network (LAN) protocol. The TCP/IP interface 228 provides network communication using the TCP/IP protocol. The serial interface 232 provides a communication to other devices that can be connected locally to the access card reader/controller 102. As one example, a serial pin pad 236 could be directly connected to the reader/controller 102 through the serial interface 232. The serial interface 232 includes a serial chip for enabling serial communications with the reader/controller 102. As such, the serial interface 232 adds scalability to the reader/controller 102.

HTTPS module 235 allows reader/controller 102 to be configured via a Web-based user interface. HTTPS module 235 includes minimal but adequate server software or firmware for serving one or more Web pages to a Web browser 237 associated with a remote user. The remote user can configure the operation and features of reader/controller 102 via the one or more Web pages served to the Web browser 237.

The encryption/decryption module 208 provides for data security by encrypting network data using an encryption algorithm, such as the advanced encryption standard (AES). The encryption/decryption module 208 also decrypts data received from the network. As discussed further below, the access control server 104 also includes corresponding encryption/decryption functionality to facilitate secured network communication. Other forms of secure data transfer that may be implemented include wired equivalent privacy (WEP), Wi-Fi protected access (WPA), and/or 32 bit Rijndael encryption/decryption.

The local I/O module 210 manages input/output locally at the access card reader/controller 102. More specifically, the local I/O module 210 includes functionality to lock and unlock the door that is controlled by the access card reader/controller 102. In this respect, the local I/O module 210 receives as inputs an auxiliary signal, a request/exit signal, and a door sensor signal. The local I/O module 210 includes a door sensor to detect whether the door is closed or open. The local I/O module 210 includes (or controls) on board relays that unlock and lock the door. The local I/O module 210 can output one or more alarm signal(s). With regard to alarm signals, in one embodiment, two transistor-to-transistor logic (TTL) voltage level signals can be output to control alarms.

The light-emitting diode (LED) module 212 controls a display at the access card reader/controller 102. A number of indicators can be presented at the reader/controller 102 to indicate mode, door state, network traffic, and others. For example, the mode may be standalone or network. In network mode, the access control server 104 makes determinations as to whether to lock or unlock the door. In standalone mode, the local authentication module 240 of reader/controller 102 determines whether to lock or unlock the door using a set of authorized IDs 238 for comparison to the ID received in the signal 204. The LED display module 212 interacts with the mode module 216 for mode determination.

The LED display module 212 also interacts with the local I/O module 210 to determine the state of the door and displays the door state. Exemplary door states are open, closed, locked, and unlocked. LED lights can flash in various ways to indicate network traffic. For example, when the bottom LED is lit red, the reader/controller is in network mode and at a predefined interval set by the user, the top LED can flash an amber color to indicate the network is still active. The LED display module 212 interacts with the device communication module 206 to indicate network traffic level.

The mode module 216 determines and/or keeps track of the mode of operation. As discussed above, and further below, the access control system can operate in various modes, depending on the circumstances. In the illustrated embodiment, the four modes are asynchronous, synchronous, standalone, and network. It is possible to be in different combinations of these modes; i.e., to be in a hybrid mode. For example, it is possible to be in an asynchronous, standalone mode. It is also possible to be in either the asynchronous mode or synchronous mode, while in the network mode.

In the network mode, the access control server 104 makes all decisions as to whether to unlock and lock the doors for all reader/controllers 102. The reader/controllers 102 monitor the access control server 104. If the access control server 104 does not communicate for a specified time duration, the reader/controller 102 enters standalone mode. In standalone mode, the reader/controller 102 makes the decisions as to whether to unlock or lock the door based on the authorized IDs 238 stored at the reader/controller 102 independently of access control server 104.

In standalone mode, the reader/controller 102 broadcasts information. The information may include identification data, mode data, door state data, or other information. The information is broadcasted asynchronously. The system is operable to automatically recover from a situation in which the access control server 104 crashes. For example, while the reader/controllers 102 asynchronously broadcast, the server 104 may come back online and detect the transmissions from the reader/controllers. The server 104 can then resume data transmissions to re-enter the network mode. Of course, the system 100 can remain in the standalone mode.

In the network mode, the reader/controllers 102 may be synchronously polled by the server 104. The server 104 may send commands to the reader/controllers 102 to transmit specified, or predetermined data. This process serves a heartbeat function to maintain communication and security functionality among the reader/controllers 102 and the access control server 104.

The FIPS module 218 implements the FIPS standard. As such the system 100 and the individual reader/controllers 102 are in compliance with the FIPS standard, promulgated by the federal government. The FIPS standard generally specifies various aspects of the access card 202 layout and data format and storage. The FIPS module 218 supports access cards 202 that implement the FIPS standard and functions accordingly.

Figure 2A:
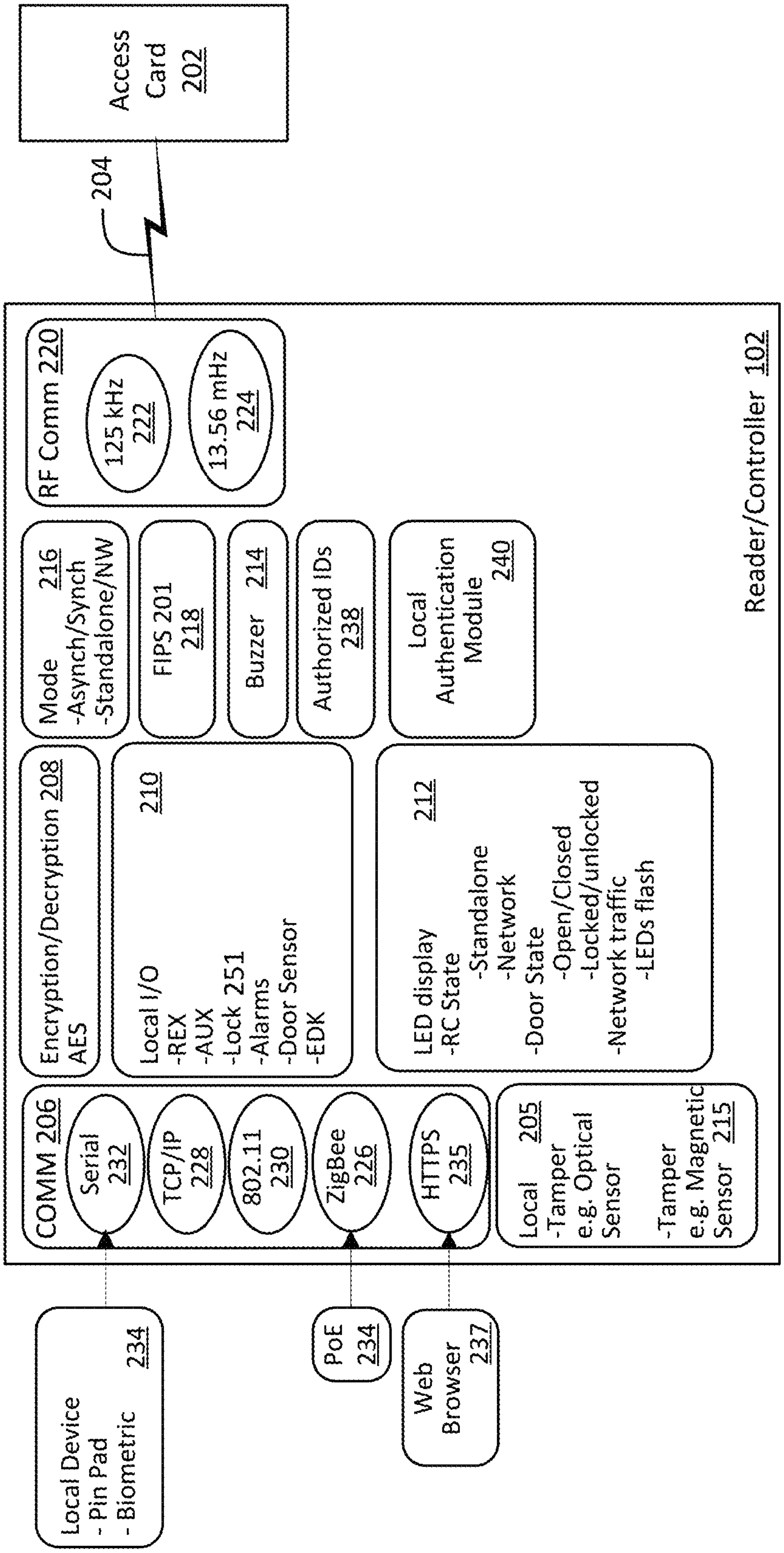
FIG. 2A is a functional block diagram illustrating functional modules that are included in a reader/controller in accordance with another embodiment.

FIG. 2A depicts another embodiment of the reader/controller 102 which contains additional components to the reader/controller shown in FIG. 2. Specifically, the local I/O 210 may contain a lock control 251, which may comprise a "lock control circuit" that sends an "unlock signal" to control the on or off, or open or closed state to determine whether a door is locked or unlocked. The various types of lock control circuits that control the locks will be discussed in further detail later in this disclosure.

There are several external access control components that may be installed along with a reader/controller in embodiments of the present disclosure, which interface at local I/O 210. As mentioned previously, the local I/O 210 module may receive inputs from and output signals to an auxiliary component (AUX). An example of an auxiliary component may be a two-way speaker located near a door that can be used to communicate with a reception desk and allow an authorized user to remotely signal the door to open. The local I/O 210 may also include a request to exit (REX) interface. An example of a request to exit mechanism may be a button that a user can press to exit a locked door from inside without presenting an access card. Additionally, the local I/O 210 may interface with additional security components. One such security component is known as an exterior door kit (EDK). An exterior door kit may be installed near an exterior door (e.g., inside an enclosed, access-controlled area) and may function to require an additional card authentication signal in conjunction with a reader controller. The exterior door kit may comprise its own switch (e.g., electro-mechanical) and require that the card authentication data be sent to it in order to switch the power to unlock the lock. This type of exterior door kit may be useful if someone tried to physically knock the reader/controller off of its mount and attempt to switch the lock by manipulating the electrical wires connecting the reader and the lock. Even if the individual were successful at manipulating the wires to route power on or off, the exterior door kit may prevent the lock from unlocking because its own internal switch will not respond without an authorized data signal. Additional access control components include motion sensors, biometric sensors, and alarms, but it is contemplated that a variety of other access control components may be utilized in conjunction with the reader/controller.

Another component depicted in FIG. 2A is an additional type of tamper detector that uses a magnetic sensor 215. It is contemplated that magnets may be used by individuals attempting to gain unauthorized access to certain types of door locks. Therefore, a magnetic sensor tamper detector 215 may provide additional security. The various types of magnetic sensors 215 that may be used will be discussed further in the disclosure, along with descriptions of the components that may be susceptible to tampering from a magnet.

Figure 3:
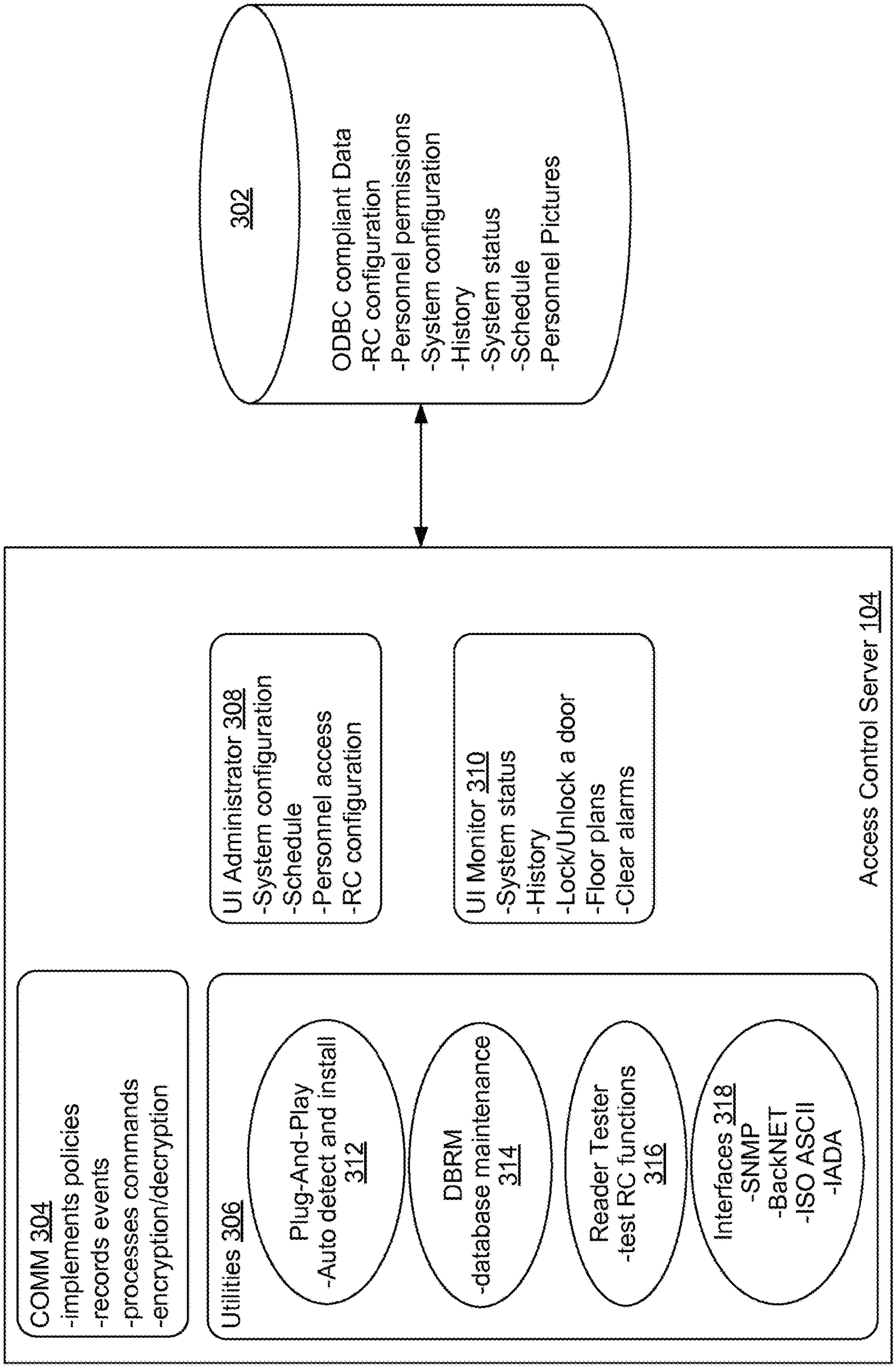
FIG. 3 is a functional block diagram illustrating functional modules that are included in an access control server in accordance with one embodiment.

FIG. 3 is a functional block diagram illustrating functional modules that are included in an access control server 104 and a database 302 in accordance with one embodiment. The server 104 includes a number of functional modules, such as a communication module 304, a utilities module 306, a user interface (UI) administrator 308, and a UI monitor 310. The database 302 stores various types of data that support functions related to access control.

More specifically, in this particular embodiment, the database 302 is open database connectivity (ODBC) compliant. The database 302 stores a number of types of data including, but not limited to, reader/controller configuration data, personnel permissions, system configuration data, history, system status, schedule data, and personnel pictures. The server 104 uses this data to manage the access control system 100.

The communication module 304 communicates with reader/controllers 102 using any of various types of communication protocols or standards (e.g., TCP/IP, 802.11, etc.). The communication module 304 implements policies that prescribe the manner in which access control communications or decision-making is to occur. For example, the communication module 304 may prescribe the order in which the different modes will be entered, depending on the circumstances.

The communication module 304 also records events that occur in the environment. Events may be the time and date of entry or leaving, the names of persons entering or leaving, whether and when a tampering incident was detected, whether and when standalone mode (or other modes) were entered, configuration or settings at the time of any of the events, and others. The communication module 304 also processes commands and responses to and from the reader/controllers 102. The communication module 304 performs network data encryption and decryption corresponding to that carried out by the reader/controllers 102.

The utilities module 306 includes a number of functional modules for implementing various features. For example, a plug-and-play utility 312 automatically detects addition of a new reader/controller 102 and performs functions to facilitate installation of the new reader/controller 102. Thus, the plug-and-play utility 312 may assign the new reader/controller 102 a unique network ID.

A database request module (DBRM) 314 performs database 302 management, which may include retrieving requested data from the database 302 or storing data in the database 302. As such, the DBRM 314 may implement a structured query language (SQL) interface.

A reader tester module 316 tests reader/controller functions. The reader tester 316 may periodically test reader/controllers 102, by querying them for certain information, or triggering certain events to determine if the reader/controllers 102 behave properly. The tester 316 may test the reader/controllers on an event-by-event basis, rather, or in addition to, a periodic basis.

An interface module 318 provides a number of communications interfaces. For example, a simple network management protocol may be provided, as well as a BackNET, International Standards Organization (ISO) ASCII interface, and an ISONAS Active DLL interface (ADI). Other interfaces or utilities may be included in addition to those shown in FIG. 3.

The UI administrator 308 can manage various aspects of the access control system 100, such as, but not limited to, system configuration, schedule, personnel access, and reader/controller configuration. The UI monitor 310 monitors the state of the access control system 100, and may responsively cause statuses to change. For example, the UI monitor 310 can monitor access control history, and floor plans, and may lock or unlock doors or clear alarms by sending the appropriate commands to the reader/testers 102.

Figure 4:
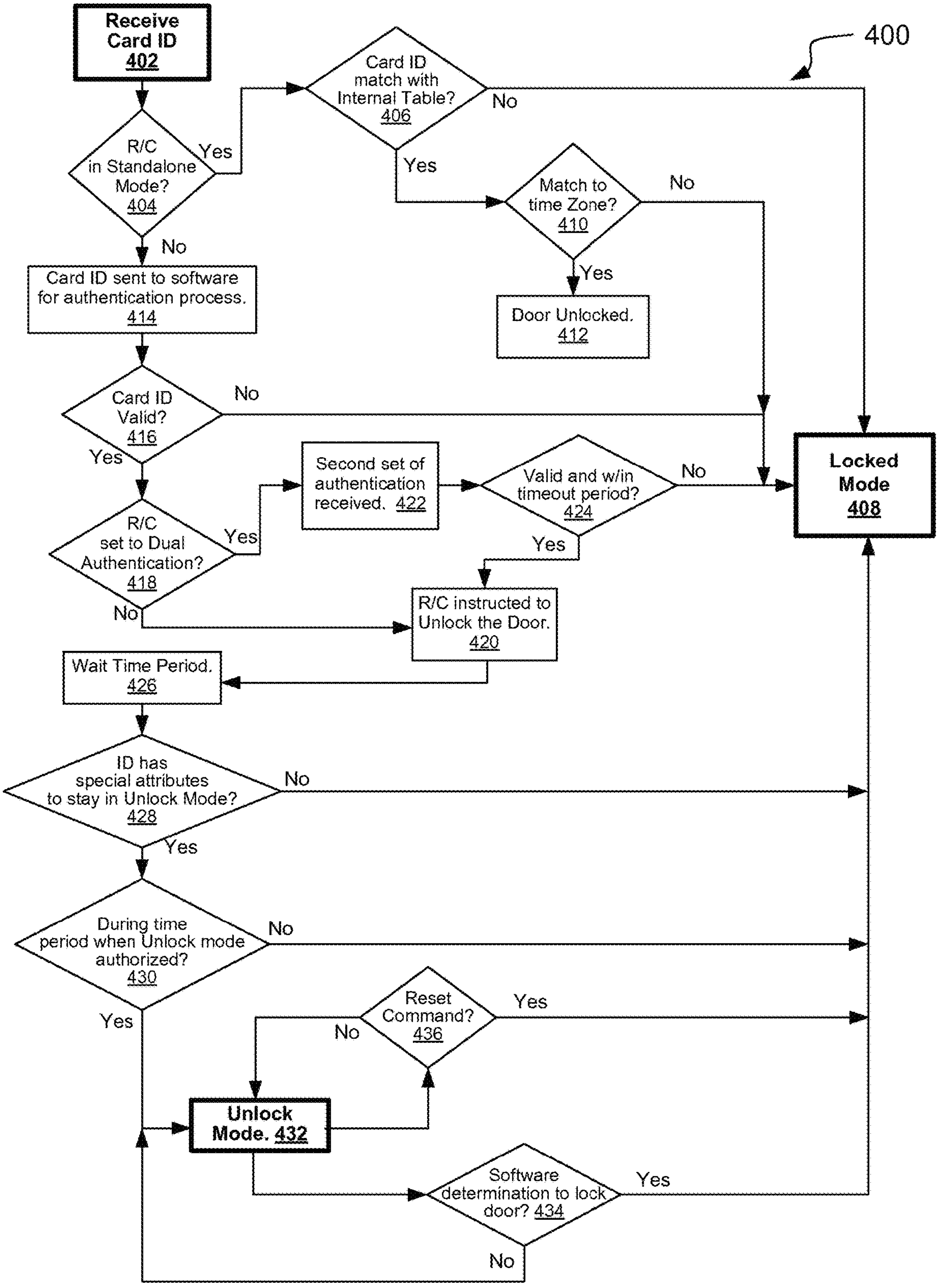
FIG. 4 is a flowchart illustrating an authentication and control algorithm that can be carried out by an access control system in accordance with an embodiment of the present invention.

FIG. 4 is a flowchart illustrating an access control algorithm 400 that authenticates individuals attempting to gain access through a locked door, which is controlled by an access control system in accordance with an embodiment of the present invention. Access control algorithm 400 is illustrative of an access control system algorithm, but the present invention is not limited to the particular order of operations shown in the FIG. 4. Operations in FIG. 4 may be rearranged, combined, and/or broken out as suitable for any particular implementation, without straying from the scope of the present invention.

As discussed above, the card reader of the access control system may enter in multiple modes, such as standalone mode, network mode, synchronous mode, and asynchronous mode. The modes can be relevant to the process by which the access control system authenticates a user and controls the state of the door. Prior to beginning the algorithm 400, it is assumed that a person has swiped an access control card, or a similar type of card, at the card reader of the access control system.

The access control algorithm 400, receives a card identifier (ID) at receiving operation 402. If the reader/controller is in standalone mode 404, then the card ID is authenticated against entries in one or more internal tables stored in the reader/controller. The internal tables include entries of “allowed” card IDs. The internal tables may be stored in RAM on the reader/controller. The internal table is scanned for an entry that matches the card ID 406. If there is no match, then the door will remain in Locked Mode 408.

If a matching entry is found, a determination is made whether the card ID is authorized to have access at this location (e.g., office, building, site, etc.) at the current time. The time that the card was read is compared with entries in a time zone table. In one embodiment, the time zone table include 32 separate time zones. If the card ID is found in the internal table 406 and if there is a match on the time zone 408, then a signal is sent to unlock the door 412.

In one embodiment of the present invention, the card ID is sent to a backend access control server that executes software for performing an authentication process 414. The authentication process 414 determines if the card ID is valid 416. Determining whether the card ID is valid can be done using card ID tables as was discussed above with respect to operation 406. If the authentication process determines that the card ID is valid, then the access control algorithm 400 determines if the reader/controller is set to dual authentication 418. If the reader/controller is not set to dual authentication then the reader/controller is instructed to unlock the door 420.

If the reader/controller is set to dual authentication, then two forms of identity need to be presented at a specific location. The first form of authentication may be the card presented to the reader/controller. The second form of authentication may be, but is not limited to, a PIN number entered on a pin pad or identification entered on a biometric device. When the access control algorithm 400 is set to dual authentication then the software delays response to the reader/controller so as to receive the second set of authentication 422. It is then determined if the second set of authentication is valid and received within a user-defined timeout period 424. If the second set of authentication is determined to be valid and is received prior to a user-defined timeout period, then the software sends the reader/controller a signal authorizing the door to be unlocked 420. If the second set of authentication is not valid or not received within the user-defined timeout period then no signal is sent to authorize the door to be unlocked and the door remains in the Locked Mode 408.

In one embodiment, a pin pad is integrated with (e.g., attached to) the housing of reader/controller 102. In another embodiment, the pin pad is separate from the housing of reader/controller 102 and is connected with communication module 206 via a wired or wireless communication link.

In one embodiment, after the reader/controller instructs the door to unlock 420, the door will remain unlocked for a second user-defined period 426. In one embodiment the card ID may have an attribute that will signal for the door to remain in unlock mode. The access control algorithm 400 determines if the card ID has the attribute to remain in unlock mode 428. If the card ID does not have the attribute, then after the second user-defined timed period the door will return to Locked Mode 408. If the card ID does have the attribute that will signal the door to remain in unlock mode, then it is determined if the card ID was presented during a time period for which the unlock mode is authorized 430. If the card ID was not presented during a time period for which the unlock mode is authorized, then the door will return to Locked Mode 408. However, the door will remain in Unlock Mode 432 if the card was presented during a time period for which the unlock mode is authorized.

In one embodiment, the Unlock Mode 432 may have been set by the card ID discussed above. The Unlock Mode 432 may also be, for example, but without limitation, sent from an unlock command originating from the software.

In one embodiment, the door will remain in the Unlock Mode 432 until such a time that the software determines is time to lock the door 434. At that software-determined time, the door will return to Locked Mode 408.

In one embodiment, at the end of every defined shift for which a reader/controller is authorized to accept cards, the software will send out a reset command to the reader/controller 436 if the current state of the reader/controller is in Unlock Mode. If a reset command is sent, the reader/controller will return to the Locked Mode 408.

Figure 5:
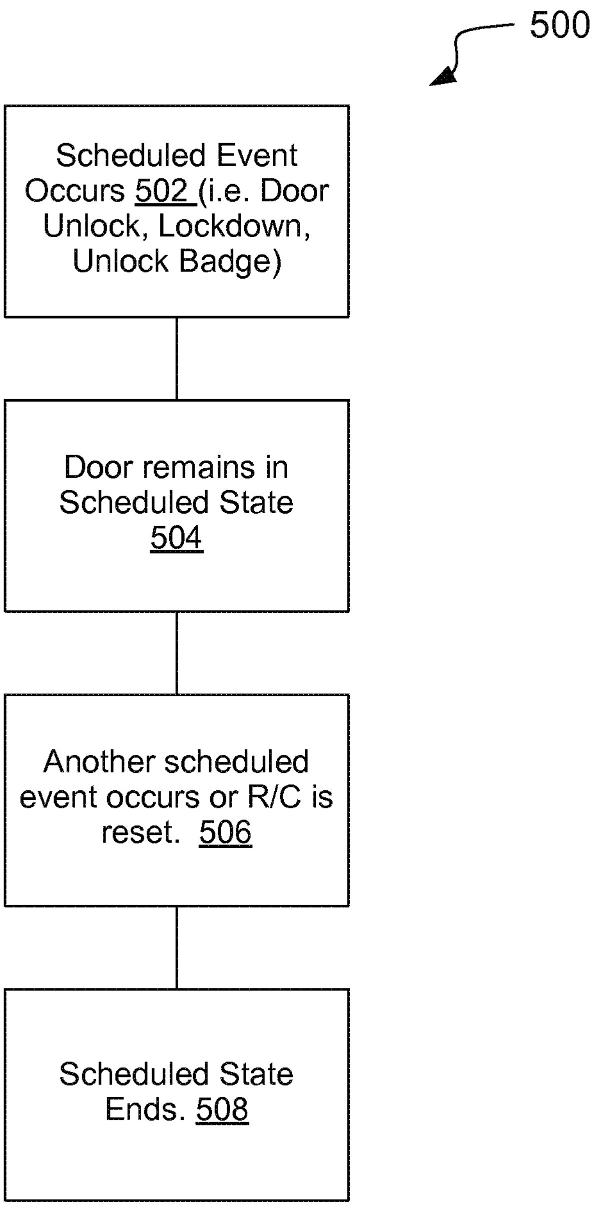
FIG. 5 is a flowchart illustrating a preconfigured event driven access control algorithm in accordance with one embodiment.

FIG. 5 is a flowchart illustrating one embodiment of a preconfigured event-driven access control algorithm 500. The software may be configured to perform a scheduled event at the reader/controller on a specific date and time 502. In one embodiment there are three types of events that are scheduled: (1) a door unlock event, (2) a lockdown event, and (3) an unlock badge event. Once one of the scheduled events has taken place, the reader/controller will cause the door to remain in the scheduled state 504 until either another scheduled event takes place or the reader/controller is reset to normal operations 506 at which point the scheduled state ends 508.

In one embodiment the door unlock event will cause the reader/controller to go into unlock mode, meaning the associated relay will be active and the two LEDS will be green.

In one embodiment the lockdown event will cause the door to lock and stay locked regardless of any cards presented to the reader/controller. When the reader/controller is in the lockdown state, the two LEDS will be red.

In one embodiment the unlock badge event will cause the reader/controller to operate normally until the next valid badge is presented, at which time the reader/controller will go into unlock mode.

Additional aspects of the disclosure relate to the controlling of a door lock by the reader/controller 102. Specifically, as shown in FIG. 2A, the lock control 251 of the local I/O 210 may send a signal via an electro-mechanical or electronic switch to lock or unlock a door (e.g., put the lock in Unlock Mode 432 or Locked Mode 408). The lock control 251 may also be referred to herein as a "lock control circuit." Two common types of door locks used with card readers generally are electric strike (also known as "lock-strike" or "door-strike") and magnetic locks (also known as mag locks). These types of door locks are commonly used in association with powered card reader systems because they can be controlled by applying electrical power in response to whether a card is authorized, although in different ways. In some embodiments of the present disclosure, the PoE that powers the reader/controller 102 itself may also be used to provide power to the door lock that is associated with the reader/controller 102. For example, an inside door equipped with a reader and an electric strike lock may have sufficient power for both the reader and the lock, and using the Ethernet cable to provide both power and data at the same time may make the wiring quite simple. However, in many other embodiments, the PoE may supply power to the reader/controller while the door lock itself is powered by an external power source. There are several reasons why a door lock may be powered by an external source other than the PoE. For example, some doors may have additional components that require power, such as additional exterior door kits, exit buttons, and motion sensors, or may have locks that require more power than can be provided through PoE. Another reason for a separate external power source may be to ensure security during a power failure of the PoE system. For example, all magnetic locks require power to be flowing in order to remain locked. For security reasons, if the PoE to the reader were to fail, doors could still remain locked if the external power source was still functioning. In embodiments where the PoE from the reader provides power to the door lock, the lock control circuit switches the PoE to the door lock on and off. In embodiments where an external power source provides power to the door lock, the lock control circuit switches the external power supply on and off.

Figure 7:
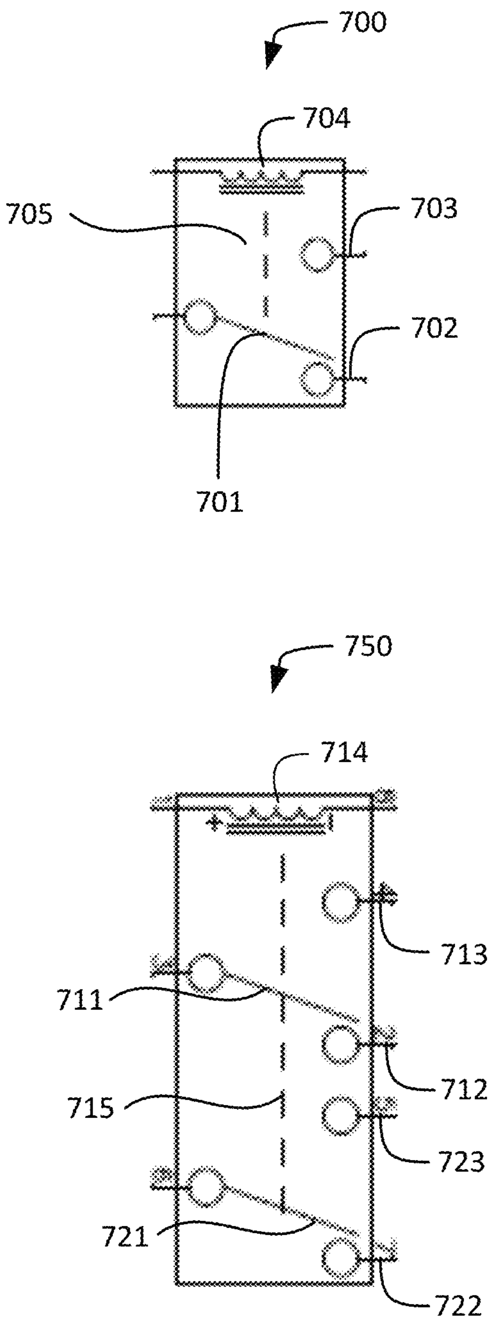
FIG. 7 shows circuit diagrams of electromechanical switches of reader/controllers that may be used in some embodiments.

In some embodiments of the present disclosure, the lock control circuit itself may comprise an electromechanical relay located in the access reader/controller itself. FIG. 7 shows two types of electromechanical relays. The first electromechanical relay 700 is known as a single pole double throw (SPDT) and the second electromechanical relay 750 is known as a double pole double throw (DPDT). These relays and variations thereof are well known in the art. As depicted in FIG. 7, the switches 701, 711, and 721 are in a "normally closed" position. The switches 700 and 750 have normally closed contacts 702, 712, and 722, and normally open contacts 703, 713, and 723. The switches 701, 711, and 721 may be simple, movable pieces of metal that normally rest in a "closed" position. A normally closed position may be advantageous to use in conjunction with magnetic locks, which require power to maintain the magnetic force created between two magnets holding a door locked. When the circuit is closed, power flows through the circuit and maintains the electromagnetic force between the magnets holding the door together. In order to open the lock purposely, taking the first relay 700 as an example, the switch 701 would have to be moved either to a neutral position (between normally open and normally closed) or to the normally open contact 703. The switch 701 may be moved by sending a current through the coil 704, which creates a magnetic field 705, which may pull the switch 701 away from the normally closed contact 702. The power flowing through the circuit is momentarily disrupted, and the electromagnetic force flowing though the magnets is also disrupted, allowing the door to open.

The same types of electromechanical relays as relays 700 and 750 may also be used by electric strike locks. An electric strike lock may be controlled using a normally-open relay configuration, though it may sometimes be used in the normally closed relay configuration. For example, many electric-strike locks are in a default locked state, and require power to be applied (i.e., a circuit to be closed) in order to move a portion of the lock out of the way of a strike to allow a door to open. Therefore, an electro-mechanical relay may be used in a normally-open configuration for an electric strike lock, and when an unlock signal is sent through the relay, the relay may be temporarily switched to a closed state to unlock the door.

It has been advantageous to use electro-mechanical relays in access control readers and controllers in the past, and in certain embodiments of the present disclosure, for several reasons. One reason is that regardless of what type of powered lock exists on a door, the same electro-mechanical relay can be used when installing the reader/controller by utilizing different wires and jumpers, and can be configured to normally-open or normally closed as necessary for the particular lock. In many embodiments of the reader/controller, a pigtail (comprising multiple ends of electrical wires, as known in the art) provides the physical connection representing the components in Local I/O 210. Additionally, many embodiments of the reader controller comprise one or more jumpers to facilitate the connection of various wires from the pigtail to various components. The multiple wires on a pigtail and the jumpers allow for multiple wiring configurations depending on what power sources are used to power the locks, what requirements a door has to fail safe or fail secure, and what other external physical components (e.g., exterior door kit, auxiliary device, request to exit button, sensor) must be wired in connection with a particular reader/controller. The multiple possible wiring configurations are thoroughly described in the publication "How to Install an ISONAS PowerNet™ Reader-Controller, Rev.2.30" by Isonas, Inc. of Boulder, CO, available at http://portal.isonas.com/files/InstallationAndWiring1.pdf, which is incorporated by reference herein in its entirety. Due to the fact that multiple external components may be connected to a reader/controller of the present disclosure, it has been useful to have the electro-mechanical relay, its associated pigtail wires, and its associated jumpers provide to compatibility to so many components, which are manufactured by a variety of vendors.

Other advantages of using electro-mechanical relays include that they have been inexpensive, small, and widely available for a long time. Many commercially-available electro-mechanical relays exist in configurations that allow them to be easily integrated into a variety of electrical circuits in a variety of places. In prior art access control systems, electro-mechanical relays could be installed in a relay bank of a central control panel.

Aspects of the present disclosure pertain to the advantages of powering and controlling individual doors at the point of the door, rather than at a relay bank of a central control panel, for reasons previously described. In certain embodiments of the present disclosure, an electro-mechanical relay may be physically located at an access card reader-controller at the point of the door, because it is more advantageous to have the relay at the individual reader/controller in certain modes, such as asynchronous mode. However, though a relay at the individual reader controller is ideal for decentralized control, an electro-mechanical relay itself in this location may create security vulnerabilities. In particular, an electro-mechanical relay may render a lock susceptible to tampering by a strong magnet. As shown in FIG. 7, magnetic fields 705 and 715 are normally created perpendicularly to the coils 704 and 714 when power is applied to the coils 704 and 714. If a strong magnet were to be placed near the switches in an orientation that created a magnetic field in the same location and direction as the magnetic fields 705 and 715, the metal switches 701, 711, and 721 could be moved even though power was not being applied via coils 704 and 714 in response to a card authorization. This security vulnerability was not present in prior art systems for several reasons, including the fact that relays were typically in a relay bank at a central control panel and not at a point of entrance, and the fact that magnets strong enough to affect such relays and small enough to be carried by individuals have only recently become available.

Figure 8:
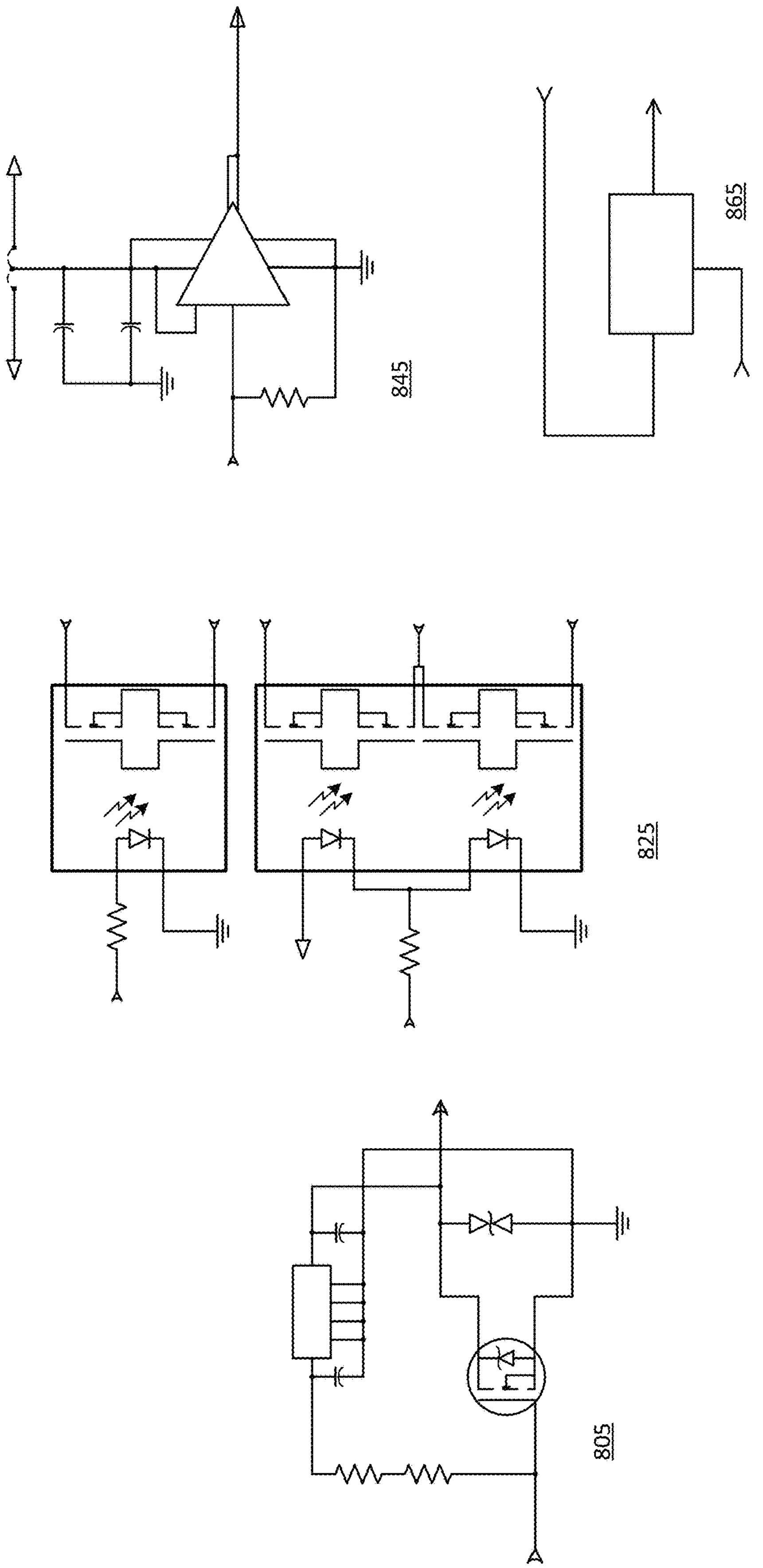
FIG. 8 shows circuit diagrams of solid state relays of reader/controllers that may be used in other embodiments.

An aspect of the present disclosure is that a solid-state relay may be used in some embodiments instead of an electro-mechanical relay within the reader/controller. FIG. 8 shows circuit diagrams of exemplary solid-state relays, which are characterized in part by being comprised of semiconductor materials and by having no mechanical moving parts. The first circuit diagram 805 shows a solid state relay known as an externally biased metal-oxide semiconductor field-effect transistor ("MOSFET"). The second circuit diagram 825 shows an optically isolated MOSFET 825. The third circuit diagram 845 shows a MOSFET driver. The fourth circuit diagram 865 shows a high side solid state switch. Each of the solid state relays depicted may be utilized in embodiments of the present disclosure, as may other types of solid state relays not shown. Although solid state relays are generally known and used in other fields, they have not previously been used in access control systems in place of mechanical relays. Various benefits and drawbacks are associated with different types of solid state relays, some of which complicate their use in access control systems. For example, the externally biased MOSFET 805 and the MOSFET driver can only be powered by direct current (DC) loads. Embodiments of the present disclosure that utilize PoE (which is a DC power source) can work with an externally biased MOSFETs and MOSFET drivers, but alternative embodiments utilizing AC power sources may not.

An additional consideration in access control, which is not necessarily a concern in other applications of solid state relays, is that powered locks must default to a particular state when there is a power failure for safety and security reasons.

For example, it is known in the art that magnetic locks and electric strike locks may need to default to a "fail safe" mode to allow a door to be unlocked in the event of a power failure in order to allow people to exit a building. Alternatively, electric strike locks may be configured to default to a "fail secure" mode to ensure that a door is locked even if there is a power failure (currently, magnetic locks are only available as "fail safe," because power is required in order for them to be locked). The requirements of various entrances to secured areas create a need for solid state relays to be wired to door locks in different ways than a mechanical relay depending on the particular lock, the particular fail safe/fail secure considerations, and the power sources supplying the solid state relay.

As discussed, previously, electro-mechanical relays are used in some reader-controllers of the present disclosure may be jumpered to receive power in a variety of different ways. For example, if desired, an electro-mechanical relay can have no jumpers in order to totally isolate the relay from any internal power except for the signal to activate the lock control circuit. It could also be jumpered to have +12V from inside the reader (from PoE) flowing to the common line (e.g., a pink line of the pigtail) of the lock control circuit. Alternatively, the electromechanical relay can be jumpered so that the internal ground of the reader (e.g., a black line of the pigtail) goes to the common line of the lock control circuit in order to derive power from an external source. Alternatively, the lock control circuit can be jumpered so that a stream of data also goes to the common line, requiring that proper authenticating data be provided through the common line in order to unlock the door. In contrast, when a solid state relay is used, there are fewer options for jumpering different external sources of power. As a result, certain configurations of reader/controllers, door locks, and power supplies may have to be wired in a different manner when reader-controllers use solid state relays than they otherwise would if they used electro-mechanical relays.

In particular, when a solid state relay is used, physical jumper connections on the back of a reader/controller may be reduced in number or completely eliminated. By definition, a solid state relay has no moving parts, and therefore no physical movement of a mechanical switch is required to turn power on or off through the relay. An advantage of using a solid state relay in a reader/controller at the door is that the relay cannot be "opened" and "closed" by a magnet in the way an electro-mechanical switch can. The solid state relay can only be controlled by software to switch ground through or not. As a result, all switching is performed by software, and not by the connection of particular jumpers. Therefore, in contrast to an electro-mechanical relay, fewer wires may be necessary to connect components of a circuit. As a comparison, when using a solid-state relay, only one wire, such as a switched ground (e.g., tan) wire of the reader/controller pigtail may need to be connected to one end of the solid state relay. In contract, in one example of using an electro-mechanical relay, both a relay switched contact (e.g., a N.O. contact) and a ground (e.g., black) wire would be connected to the load (e.g., mag lock or door strike) in a case where a jumper provides 12 v (from the reader) to the relay common. When using a solid state relay, only one of the wires would be connected to the switched end of the relay, and instead of a jumper, the connection between the common and the ground would be switched via software instructions. Although the solid state relay makes physical connections to the relay simpler than connections to an electromechanical relay (e.g., one wire in rather than two), replacing an electro-mechanical relay with a solid-state relay in a reader/controller may complicate wiring to other access control components. For example, a solid state relay may make it more difficult to wire existing exterior door kits known in the art. As described earlier, an exterior door kit may require both power and data to be sent to it in order to activate the second relay. Many existing exterior door kits require a separate wire connection for power and another one for data, which would normally be available from a reader/controller with an electro-mechanical switch. However, a reader/controller with a solid state relay may be able to provide both the data and the power through one wire. Although one wire may appear be more efficient than two, many existing exterior door kits may not function at all if they do not detect a second wire. Therefore, a workaround must be created in order for the exterior door kit to function with a reader/controller with a solid state relay, such as attaching a dummy wire and/or programming override instructions from an access control server. Exterior door kits are only one example. Many of the components of an access control system may have to be wired differently in order to account for the fact that a solid state relay reader/controller has fewer jumpering options, in light of the fact that in the access control industry, many components are configured to interact with electromechanical relays.

Figure 9A:
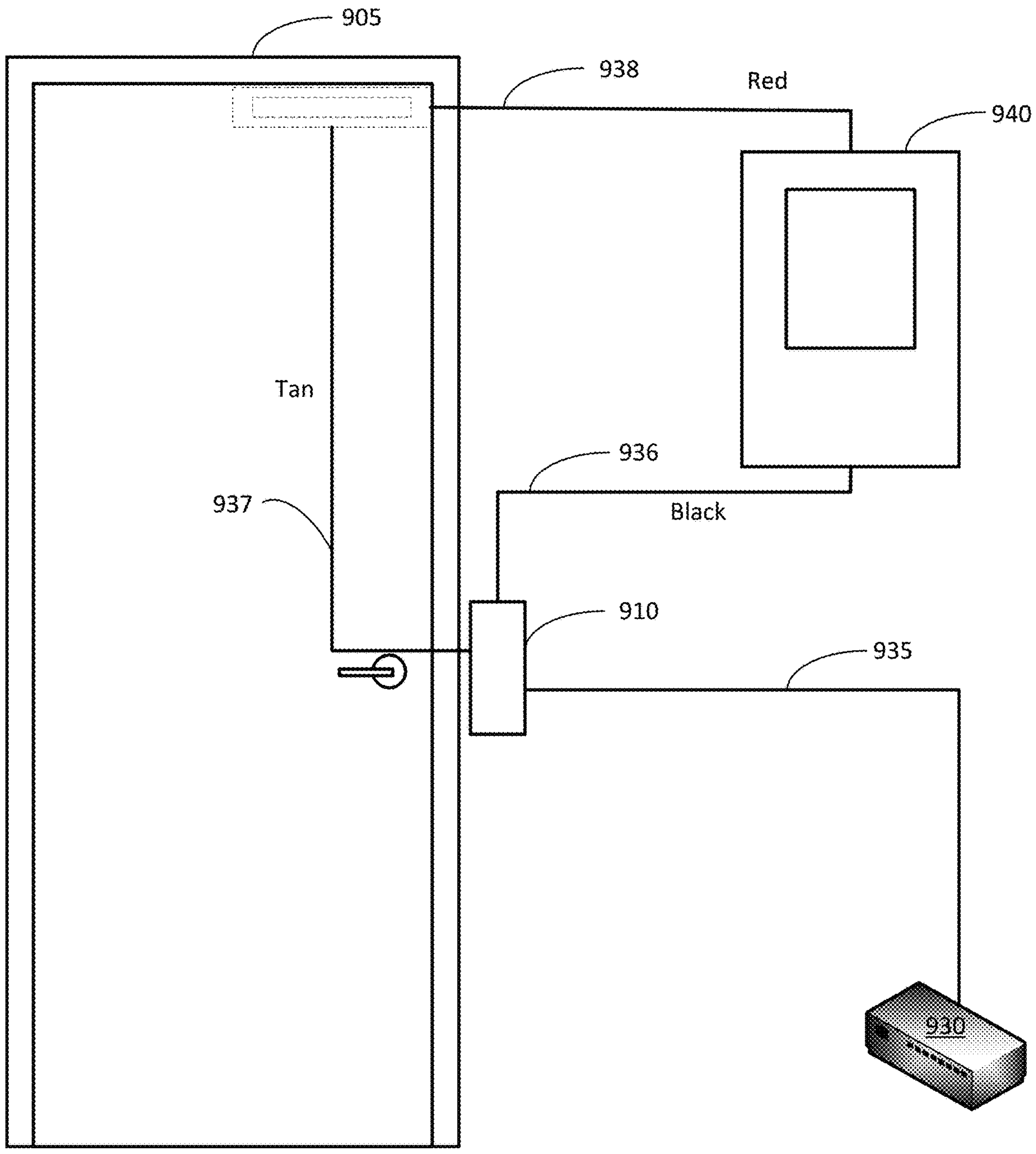
FIG. 9A is a wiring diagram illustrating how a reader/controller, a door lock, a network switch, and an external power supply may be connected according to some embodiments.
Figure 9B:
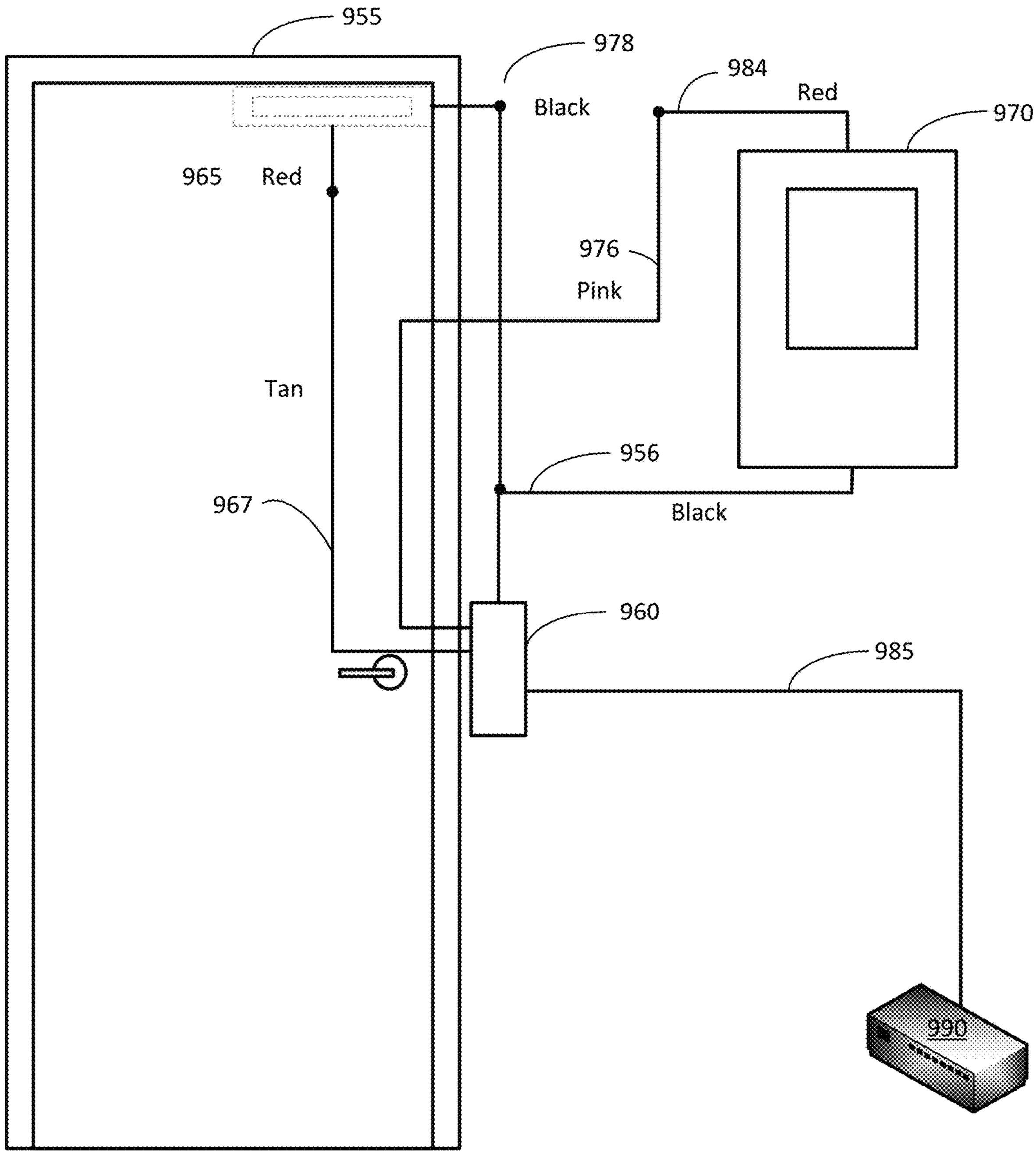
FIG. 9B is a wiring diagram illustrating how a reader/controller, a door lock, a network switch, and an external power supply may be connected according to some embodiments.

FIGS. 9A, and 9B show two different configurations of how a reader/controller with a solid state relay may be wired to a magnetic lock. Depending on the type of solid state relay used, wiring configurations can vary. Additionally, certain wire colors may be different than the ones shown in the drawings. FIGS. 9A and 9B are just two examples of possible wiring configurations. FIG. 9A shows a diagram of a door 901 equipped with a magnetic lock 905 and a reader/controller 910 according to an embodiment of the present disclosure. The magnetic lock 905 is shown in dotted lines to signify that it is located on the inside of the doorway, and that the view of the door 901 is from the outside. However, a magnetic lock may be located in other locations than the one shown. The reader/controller 910 is located outside the doorway. Though not shown, the reader/controller 910 contains a solid state relay according to embodiments of the present disclosure. Other components are shown in a wiring diagram format to illustrate how the solid state relay in the reader controller may be connected to various components in the system in order to meet certain requirements. As described earlier in the disclosure, the reader/controller may receive power over Ethernet (PoE) from a network switch 930 via an Ethernet cable 935. A tan wire 937 may form one part of the circuit between the reader controller 910 and the magnetic lock 905. In embodiments of the present disclosure, a tan wire from the reader pigtail may be one of the options to connect to the magnetic lock 905, but other color wires may be used. A black wire 936, which is the ground, may be connected to the ground of a fire panel 940, and a red (hot) wire 938 may provide power from the fire panel 940 to the magnetic lock 905. In this diagram, external power from the fire panel 940 provides power to the magnetic lock 905 while PoE provides power to the reader/controller 910. Therefore, when the lock circuit (comprising the solid state relay) switches power through to the magnetic lock 905, it is switching the power provided by the fire panel 940. Though a fire panel is shown in this diagram, other external sources of DC power in a building may be used in place of a fire panel.

Powering the magnetic lock 905 through the fire panel 940 may be advantageous over powering the lock itself via PoE. For example, if there is a fire in the building, the magnetic lock 905 should automatically open, which typically requires power to be shut off to the circuit. However, the fire may not cause the network switch 930 to fail, and if the lock were powered by PoE, the network switch 930 might continue to provide power through the solid state relay beyond the time at which a fire is detected. Conversely, if the network switch were to fail for some other reason than a fire, it might be detrimental for all the exterior doors to become unlocked due to the PoE power failure. A fire panel has other components that inform it of a fire anywhere in the building, so in the event of a fire, the fire panel 940 may shut off the DC power through the red wire, thereby cutting off power to the magnetic lock 905 even though power is still flowing through the Ethernet cable 935 and the solid state relay in the reader/controller 910.

A particular consideration when specifically using an externally-biased MOSFET solid state relay in a reader-controller, such as externally-biased MOSFET 805 in FIG. 8, is that a specific jumper for it may be required to employ one of its benefits. One function of the externally biased MOSFET 805 is that it may be set to have a default (i.e., biased) state in which it allows power through. When a reader-controller is powered from an external power source, a jumper for the externally-biased MOSFET 805 may be selected such that external power would still flow through even if the reader's PoE power were to fail. This jumper to the externally-biased MOSFET may be important in door configurations with magnetic locks, which require power to flow through in order to stay locked. The jumper may not be selected in configurations where the reader PoE power provides the power to the lock, because if the reader PoE power were to fail, there would be no other power source through which the externally-biased MOSFET 805 could be biased to on.

FIG. 9B shows a wiring diagram of a reader controller 960 with a particular type of solid state switch known as a high-side switch. In this embodiment, a high-side switch is used because the particular kind of magnetic lock used is a "smart" magnetic lock 955. A smart magnetic lock is a newer type of magnetic lock that reduces lag time between when power is removed from a magnetic lock to when the magnetic field actually disengages and releases the lock, allowing a door to open. In traditional magnetic locks, there may be a delay of approximately one second between when power is removed and when the magnetic field holding together the lock disappears. A user of a reader/controller access system may find this delay inconvenient or disconcerting, even though it is a short delay. Smart magnetic locks allow the quick release of a magnetic field once power to the magnetic lock has been switched off. A unique requirement of most smart magnetic locks is that power cannot be removed by switching ground (e.g., the black wire 935 of FIG. 9A), because switching ground can cause the magnetic field to disappear slowly. Instead, most smart magnetic locks require that the power side of the circuit be switched (e.g., the red wire 938 of the power supply 940 of FIG. 9A). Switching the power side instead of the ground could be accomplished with a mechanical or electromechanical relay, but in embodiments of the present disclosure, where a solid state relay is desired, a high-side solid state relay can properly accomplish the switching of the power side in order to meet the requirements of the smart magnetic lock.

In FIG. 9B, the reader/controller 960 with the high-side solid state switch is shown with a tan wire 967 connected to a red power wire 965 of the smart magnetic lock 955. In contrast to FIG. 9A, where the red wire 938 of the fire panel power source 940 is connected directly to the traditional magnetic lock 905, in FIG. 9B, the red wire 984, which provides power from the fire panel power source 970, is connected to a pink (common) wire 976 of the reader/controller 960. By connecting the red wire 984 to the pink common wire 976 of the reader/controller 960, the high side switch can essentially switch the power from the red wire 984 in order to engage and disengage the smart lock 955 instead of switching ground (i.e., the black wire 956 from the fire panel power source 970).

Figure 10:
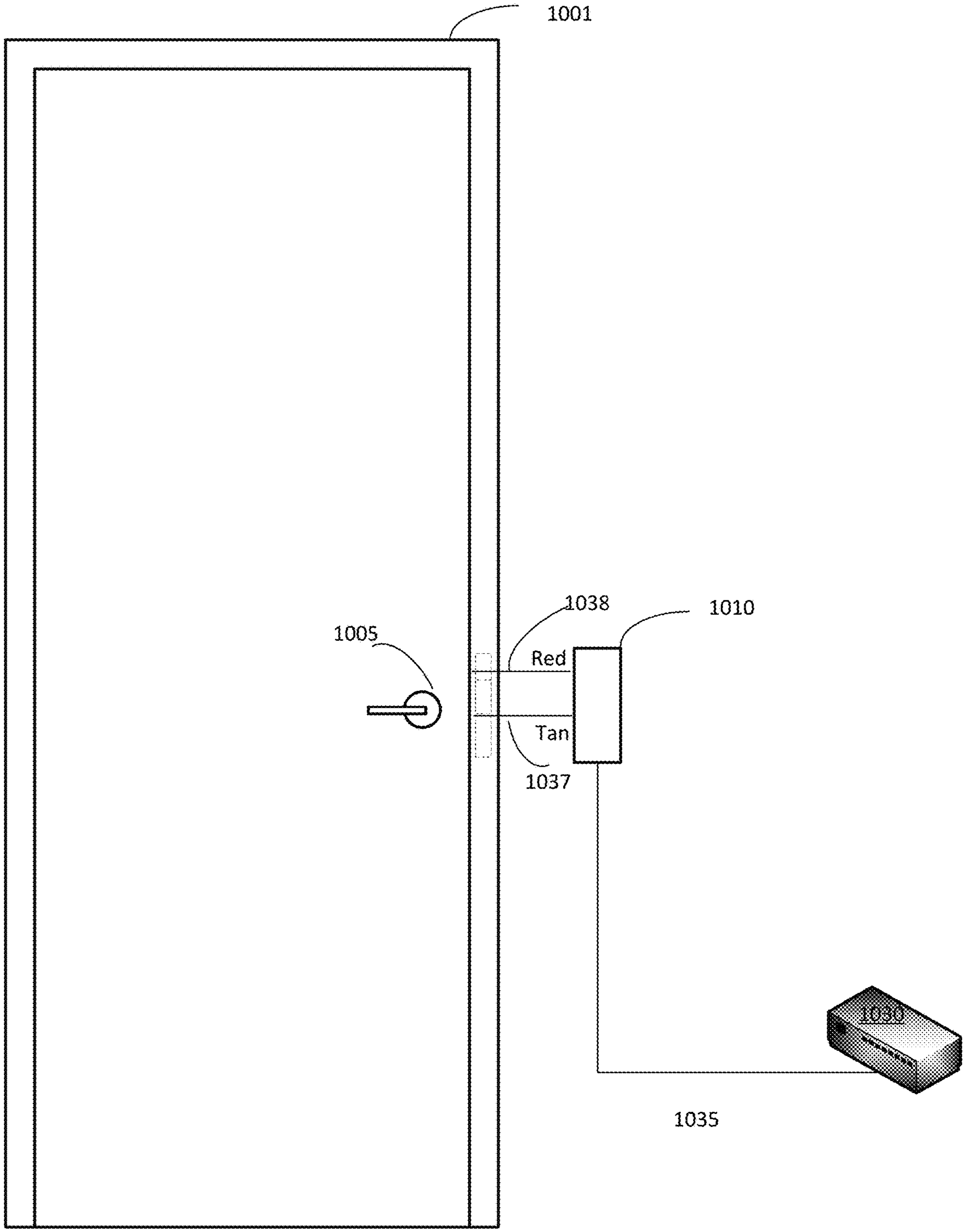
FIG. 10 is a wiring diagram illustrating how a reader/controller, a door lock, and a network switch may be connected according to some embodiments.

FIG. 10 shows diagram of a door 1001 configured with an electric strike lock 1005 and a reader/controller 1010. The reader/controller 1010 is located outside the doorway, and though not shown, it contains a solid state relay. Similarly to FIGS. 9A and 9B, other components are shown in a wiring diagram format to illustrate how the solid state relay in the reader controller may be connected to various components in the system. In particular, the network switch 1030 may be connected to the reader/controller via an Ethernet cable 1035 to supply PoE. The circuit between the reader/controller 1010 may be completed by a tan wire 1037 and a red wire 1038. This configuration allows power to flow through the tan wire and through the solid state relay only when the reader/controller receives the proper authentication signal from an access card. Because an electric strike lock needs power in order to unlock, this configuration will cause the door to remain locked in the event of a power failure at the point of the network switch 1030 ("fail secure"). The wiring diagram in FIG. 10 shows a configuration in which power is provided to both reader controller 1010 and the electric strike lock 1005 itself via PoE. Therefore, when the solid state relay switches power on to the electric/strike lock 1005, it is switching PoE. FIGS. 9 and 10 are only two examples of how a reader/controller with a solid state relay may be wired to locks and power supplies. Additional connections are contemplated for the various combinations of external access control components.

Another aspect of the disclosure is that magnetic tampering may be detected by components within the reader/controller. Tamper detection may be beneficial to enhance security of enclosed areas. Certain embodiments of the present disclosure include tamper sensors as described with reference to FIG. 2, such as optical sensors. It is contemplated that as the vulnerability of electro-mechanical relays becomes more widely known, unauthorized individuals may attempt to gain access to enclosed areas by passing strong magnets near reader/controllers. In embodiments of the present disclosure where electro-mechanical relays are used, the detection of a strong magnet via a magnetic tamper detector may prevent unauthorized access by sending a signal to cause the door to remain locked. Even in embodiments where a solid state relay is used, and though a strong magnet would have no effect on the relay itself, a magnetic tamper detector may still be utilized. It may be beneficial to send a signal to other parts of the system (such as a central access control server) to alert security personnel of an attempted break-in, and it may be used to signal the door to remain locked anyway in case the unauthorized individual attempts other ways of tampering.

Figure 11:
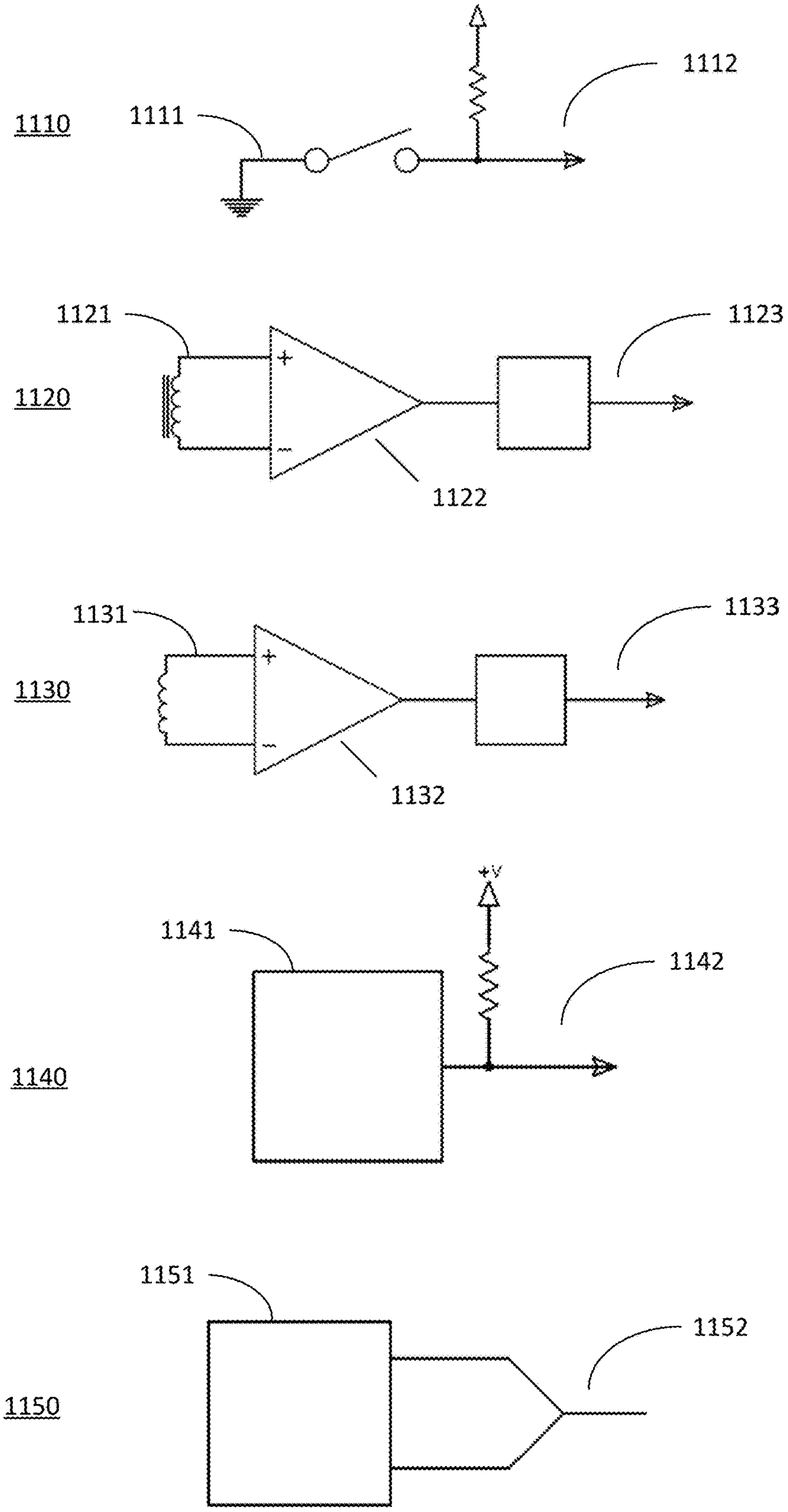
FIG. 11 depicts circuit diagrams of magnetic tamper detectors according to several embodiments.

FIG. 11 shows electrical diagrams of a variety of devices that may be used to detect magnetic tampering in accordance with embodiments of the present disclosure. Each of the devices pairs a mechanism for detecting a magnetic field with a mechanism for sending a signal in response to the detection. FIG. 11 shows a reed relay 1111 that outputs an analog or digital magnet detection signal 1112. Other embodiments of magnetic tamper detection device include a cored inductor 1121 and an amplifier 1122 that output an analog or digital magnet detection signal 1123, and a noncored inductor 1131 and an amplifier 1132 that output an analog or digital magnet detection signal 1133. Yet other embodiments include solid state magnetic flux sensing devices 1141 and 1151. These devices may comprise any number of known and yet-to-be implemented magnetic flux sensing devices, including Hall effect sensors, angle sensors, compasses, and magnetometers, among others. As shown, the magnetic flux sensing device 1141 may output an analog or digital magnetic detection signal 1142, or the magnetic flux sensing device 1151 may be linked to any coded communications interface 1152. These communications interfaces may include, but are not limited to, serial communications, 1-Wire, 2Wire, I2C, SPIr, PWM, and other communications interfaces as known in the art. The communications interfaces may be used to send signals to an access control server to alert security personnel of attempted tampering.

Figure 6:
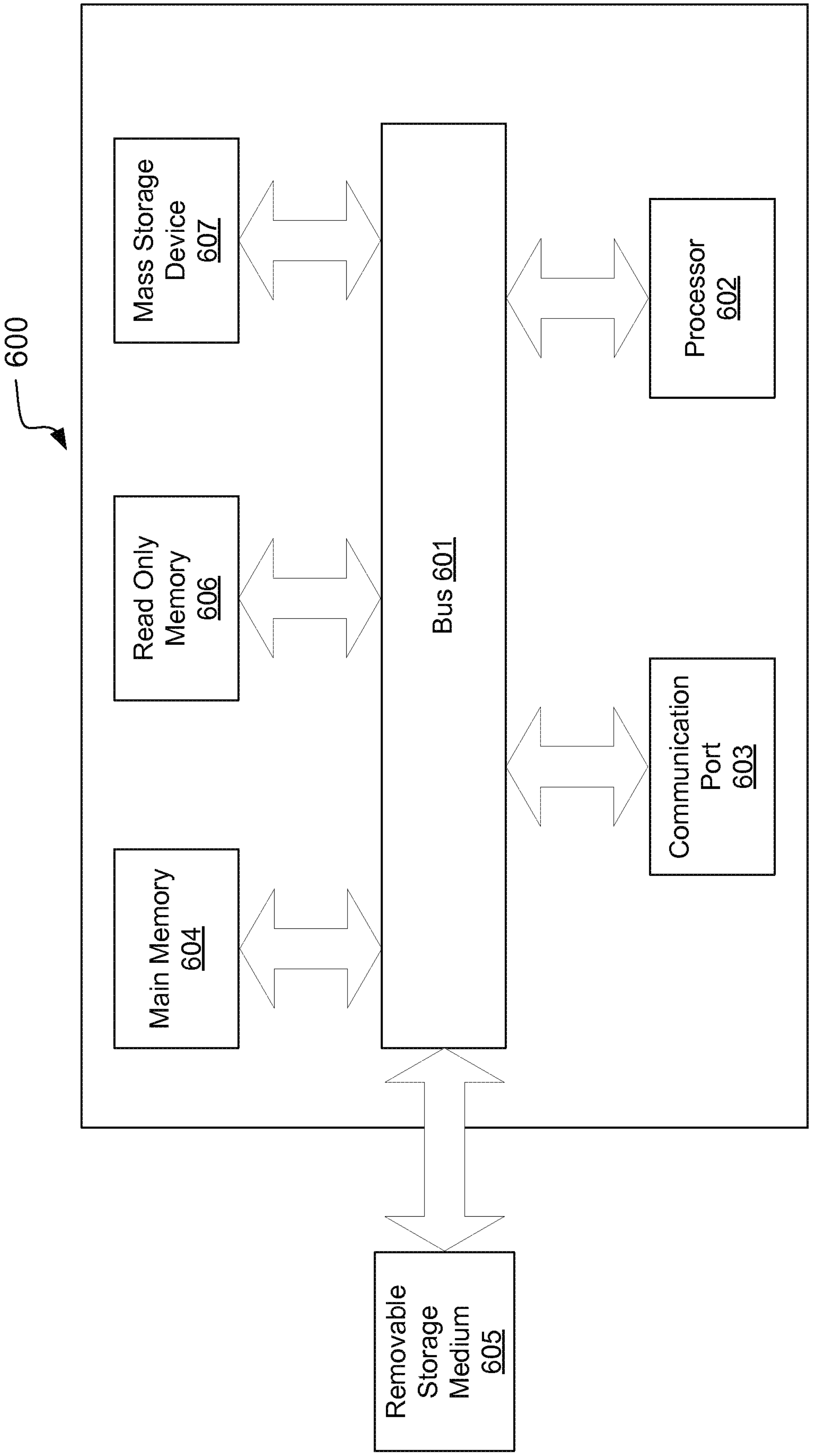
FIG. 6 is a schematic diagram of a computing device upon which embodiments of the present invention may be implemented and carried out.

FIG. 6 is a schematic diagram of a computing device upon which embodiments of the present invention may be implemented and carried out. The components of computing device 600 are illustrative of components that an access control server and/or a reader/controller may include. However, any particular computing device may or may not have all of the components illustrated. In addition, any given computing device may have more components than those illustrated.

As discussed herein, embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

According to the present example, the computing device 600 includes a bus 601, at least one processor 602, at least one communication port 603, a main memory 604, a removable storage medium 605 a read only memory 606, and a mass storage 607. Processor(s) 602 can be any known processor such as, without limitation, an INTEL ITANIUM or ITANIUM 2 processor(s), AMD OPTERON or ATHLON MP processor(s), or MOTOROLA lines of processors. Communication port(s) 603 can be any of an RS-232 port for use with a serial connection, a 10/100 Ethernet port, or a Gigabit port using copper or fiber. Communication port(s) 603 may be chosen depending on a network such a Local Area Network (LAN), Wide Area Network (WAN), or any network to which the computing device 600 connects. The computing device 600 may be in communication with peripheral devices (not shown) such as, but not limited to, printers, speakers, cameras, microphones, or scanners.

Main memory 604 can be Random Access Memory (RAM), or any other dynamic storage device(s) commonly known in the art. Read only memory 606 can be any static storage device(s) such as Programmable Read Only Memory (PROM) chips for storing static information such as instructions for processor 602. Mass storage 607 can be used to store information and instructions. For example, hard disks such as the Adaptec® family of SCSI drives, an optical disc, an array of disks such as RAID, such as the Adaptec family of RAID drives, or any other mass storage devices may be used.

Bus 601 communicatively couples processor(s) 602 with the other memory, storage and communication blocks. Bus 601 can be a PCI/PCI-X, SCSI, or USB based system bus (or other) depending on the storage devices used. Removable storage medium 605 can be, without limitation, any kind of external hard-drive, floppy drive, IOMEGA ZIP DRIVE, flash-memory-based drive, Compact Disc-Read Only Memory (CD-ROM), Compact Disc-Re-Writable (CD-RW), or Digital Video Disk-Read Only Memory (DVD-ROM). In some embodiments, the computing device 600 may include multiple removable storage media 605.

FIG. 6 below shows a diagrammatic representation of another embodiment of a machine in the exemplary form of a computer system 600 within which a set of instructions for causing a device to perform any one or more of the aspects and/or methodologies of the present disclosure to be executed.

In FIG. 6, Computer system 600 includes a processor 605 and a memory 610 that communicate with each other, and with other components, via a bus 615. Bus 615 may include any of several types of bus structures including, but not limited to, a memory bus, a memory controller, a peripheral bus, a local bus, and any combinations thereof, using any of a variety of bus architectures.

Memory 610 may include various components (e.g., machine readable media) including, but not limited to, a random access memory component (e.g., a static RAM "SRAM", a dynamic RAM "DRAM, etc.), a read only component, and any combinations thereof. In one example, a basic input/output system 620 (BIOS), including basic routines that help to transfer information between elements within computer system 600, such as during start-up, may be stored in memory 610. Memory 610 may also include (e.g., stored on one or more machine-readable media) instructions (e.g., software) 625 embodying any one or more of the aspects and/or methodologies of the present disclosure. In another example, memory 610 may further include any number of program modules including, but not limited to, an operating system, one or more application programs, other program modules, program data, and any combinations thereof.

Computer system 600 may also include a storage device 630. Examples of a storage device (e.g., storage device 630) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 630 may be connected to bus 615 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 630 may be removably interfaced with computer system 600 (e.g., via an external port connector (not shown)). Particularly, storage device 630 and an associated machine-readable medium 635 may provide non-volatile and/or volatile storage of machine-readable instructions, data structures, program modules, and/or other data for computer system 600. In one example, software 625 may reside, completely or partially, within machine-readable medium 635. In another example, software 625 may reside, completely or partially, within processor 605. Computer system 600 may also include an input device 640. In one example, a user of computer system 600 may enter commands and/or other information into computer system 600 via input device 640. Examples of an input device 640 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 640 may be interfaced to bus 615 via any of a variety of interfaces (not shown) including, but not limited to, a serial interface, a parallel interface, a game port, a USB interface, a FIREWIRE interface, a direct interface to bus 615, and any combinations thereof.

A user may also input commands and/or other information to computer system 600 via storage device 630 (e.g., a removable disk drive, a flash drive, etc.) and/or a network interface device 645. A network interface device, such as network interface device 645 may be utilized for connecting computer system 600 to one or more of a variety of networks, such as network 650, and one or more remote devices 655 connected thereto. Examples of a network interface device include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 650, may employ a wired and/or a wireless mode of communication. In general, any network topology may be used. Information (e.g., data, software 625, etc.) may be communicated to and/or from computer system 600 via network interface device 645.

Computer system 600 may further include a video display adapter 660 for communicating a displayable image to a display device, such as display device 665. A display device may be utilized to display any number and/or variety of indicators related to pollution impact and/or pollution offset attributable to a consumer, as discussed above. Examples of a display device include, but are not limited to, a liquid crystal display (LCD), a cathode ray tube (CRT), a plasma display, and any combinations thereof. In addition to a display device, a computer system 600 may include one or more other peripheral output devices including, but not limited to, an audio speaker, a printer, and any combinations thereof. Such peripheral output devices may be connected to bus 615 via a peripheral interface 670. Examples of a peripheral interface include, but are not limited to, a serial port, a USB connection, a FIREWIRE connection, a parallel connection, and any combinations thereof. In one example an audio device may provide audio related to data of computer system 600 (e.g., data representing an indicator related to pollution impact and/or pollution offset attributable to a consumer).

A digitizer (not shown) and an accompanying stylus, if needed, may be included in order to digitally capture freehand input. A pen digitizer may be separately configured or coextensive with a display area of display device 665. Accordingly, a digitizer may be integrated with display device 665, or may exist as a separate device overlaying or otherwise appended to display device 665.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for controlling access to an enclosed area, the method comprising:

receiving a credential identifier in an access controller associated with an entrance to the enclosed area;

authenticating the credential identifier; and sending an unlock signal through a relay of the access controller to power a lock associated with the access controller to unlock a door at the entrance to the enclosed area when the credential identifier has been successfully authenticated, wherein the relay is powered via a direct current power source, and wherein at least a portion of the access controller is powered via a Power-over-Ethernet (PoE) interface.

2. The method of claim 1, wherein the unlock signal is sent through the relay via the direct current power source.

3. The method of claim 1, wherein the relay is a solid state relay.

4. The method of claim 3, wherein the solid state relay comprises a metal-oxide-semiconductor field-effect transistor.

5. The method of claim 1, wherein the relay is a mechanical relay.

6. The method of claim 1, wherein the unlock signal is sent through a mechanical relay and a solid state relay.

7. The method of claim 1, wherein the relay is positioned within the access controller.

8. The method of claim 1, further comprising determining an operational mode of the access controller from a set of operational modes including a standalone mode and a network mode; and wherein authenticating the credential identifier comprises one of:

authenticating the credential identifier by transmitting the credential identifier to an access control server in response to a determination that the access controller is in the network mode; and authenticating the credential identifier by comparing the credential identifier to entries of at least one table accessible to the access controller in response to a determination that the access controller is in the standalone mode.

9. An access control device for controlling access to an enclosed area, the access control device comprising:

a communication module configured to receive a credential identifier; and a local input/output module configured to send an unlock signal through a relay of the access control device to power a lock associated with the access controller to unlock a door at an entrance to the enclosed area in response to successful authentication of the credential identifier, wherein the relay is powered via a direct current power source, and wherein at least a portion of the access control device is powered via a Power-over-Ethernet (PoE) interface.

10. The access control device of claim 9, wherein the unlock signal is sent through the relay via the direct current power source.

11. The access control device of claim 9, wherein the relay is a solid state relay.

12. The access control device of claim 9, wherein the relay is a mechanical relay.

13. The access control device of claim 9, wherein the relay is positioned within the access control device.

14. The access control device of claim 9, further comprising:

a mode module configured to determine an operational mode of the access control device from a set of operational modes including a standalone mode and a network mode; and a local authentication module configured to authenticate the credential identifier against of at least one table accessible to the access control device in response to a determination that the access control device is in the standalone mode; and wherein the communication module is configured to authenticate the credential identifier by transmitting the credential identifier to an access control server in response to a determination that the access control device is operating in the network mode.

15. An access control device for controlling access to an enclosed area, the access control device comprising:

at least one processor; and at least one memory comprising a plurality of instructions stored thereon that, in response to execution by the at least one processor, causes the access control device to:

receive a credential identifier associated with an entrance to the enclosed area authenticate the credential identifier; and send an unlock signal through a relay of the access control device to power a lock associated with the access control device to unlock a door at the entrance to the enclosed area subsequent to successful authentication of the credential identifier, wherein the relay is powered via a direct current power source.

16. The access control device of claim 15, wherein the unlock signal is sent through the relay via the direct current power source.

17. The access control device of claim 15, wherein at least a portion of the access control device is powered via a Power-over-Ethernet (PoE) interface.

18. The access control device of claim 15, wherein the relay is positioned within the access control device.

* * * * *